(12) United States Patent
Stoeger (10) Patent No.: US 10,020,726 B2
(45) Date of Patent: Jul. 10, 2018

(54) HYSTERESIS CONTROL OF A DC-DC CONVERTER

(71) Applicant: Continental Automotive GmbH, Hannover (DE)

(72) Inventor: Christian Stoeger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/565,121

(22) PCT Filed: Mar. 30, 2016

(86) PCT No.: PCT/EP2016/056857
§ 371 (c)(1),
(2) Date: Oct. 6, 2017

(87) PCT Pub. No.: WO2016/162243
PCT Pub. Date: Oct. 13, 2016

(65) Prior Publication Data
US 2018/0109183 A1     Apr. 19, 2018

(30) Foreign Application Priority Data

Apr. 8, 2015   (DE) .................. 10 2015 206 243

(51) Int. Cl.
*H02M 3/156* (2006.01)
*H02M 1/00* (2006.01)

(52) U.S. Cl.
CPC .... *H02M 3/156* (2013.01); *H02M 2001/0016* (2013.01); *H02M 2001/0025* (2013.01)

(58) Field of Classification Search
CPC ......... H02M 3/156; H02M 2001/0016; H02M 2001/0025
See application file for complete search history.

(56) References Cited

U.S. PATENT DOCUMENTS

| 7,030,596 B1 * | 4/2006 | Salerno ................ H02M 3/158 323/282 |
| 7,548,047 B1 | 6/2009 | Dasgupta et al. |

(Continued)

FOREIGN PATENT DOCUMENTS

| DE | 102013213639 A1 | 1/2014 |
| DE | 102012223452 A1 | 6/2014 |
| EP | 2741578 A1 | 6/2014 |

OTHER PUBLICATIONS

Chung H S-H et al.; "Dynamic Hysteresis Band Control of the Buck Converter With Fast Transient Response"; IEEE Transactions on Circuits and Systems Institute of Electrical and Electronics Engineers Inc., Jul. 1, 2005, vol. 52, No. 7; New York, NY, USA.

(Continued)

*Primary Examiner* — Jue Zhang (57) ABSTRACT

Method and apparatus for controlling the hysteresis of an output current from a DC-DC converter (3) to a default value (19) for an average output current and within a hysteresis range (11), wherein the output current (6) is measured and is compared with a first reference value and a second reference value, wherein a switch (7) of the DC-DC converter (3) is changed over at the limits of the hysteresis range (11) on the basis of a first reference time (20), at which the output current (6) reaches the first reference value, and a second reference time (24), at which the output current reaches the second reference value, wherein the switch (7) is changed over with a time delay after the second reference time (24), and wherein the time delay is selected on the basis of a time difference between the first reference time (20) and the second reference time (24) in such a manner that a period of time, during which the output current (6) is higher than the default value (19), and a period of time, during which the output current (6) is lower than the default value (19), are compensated for.

13 Claims, 4 Drawing Sheets

(56) References Cited

U.S. PATENT DOCUMENTS

| | | | |
|---|---|---|---|
| 2004/0032242 A1* | 2/2004 | Corva | H02M 3/156 |
| | | | 323/284 |
| 2004/0145927 A1* | 7/2004 | Haase | H02M 3/156 |
| | | | 363/62 |
| 2010/0244801 A1* | 9/2010 | Arora | H02M 3/1563 |
| | | | 323/284 |
| 2014/0028205 A1 | 1/2014 | Lischka | |
| 2014/0125304 A1* | 5/2014 | Wiethege | H02M 3/1563 |
| | | | 323/282 |
| 2015/0333625 A1 | 11/2015 | Stoeger | |

OTHER PUBLICATIONS

International Search Report and Written Opinion dated Jun. 23, 2016 from corresponding International Patent Application No. PCT/EP2016/056857.

Office Action German Patent and Trademark Office dated Jul. 22, 2015 from the corresponding German Patent Application 10 2015 206 243.0.

\* cited by examiner

HYSTERESIS CONTROL OF A DC-DC CONVERTER

The invention relates to a method for controlling the hysteresis of an output current from a DC-DC converter to a default value for an average output current and within a hysteresis range, as well as to an apparatus for carrying out the method, wherein the output current is measured and is compared with a first and a second reference value, wherein a switch of the DC-DC converter is changed over at the limits of the hysteresis range on the basis of a first reference time, at which the output current reaches the first reference value, and a second reference time, at which the output current reaches the second reference value. The apparatus accordingly has measuring means for monitoring the output current of the DC-DC converter and switching means for changing over a switch of the DC-DC converter, wherein the measuring means are connected to comparing means for comparing the measured output current with a first and a second reference value, wherein the comparing means are equipped to signal a reaching of the first or second reference value.

When using DC-DC converters for the constant power supply of changeable loads, a control is indispensable, in order to be able to adapt the output voltage of the converter to the changing load impedance. Even though typical current controllers, e.g. PI controllers, can compensate for slow effects, such as effects dependent on temperature or aging, and possibly for slowly fluctuating input voltages, they are unable to handle rapidly changing loads, such as occur for example in the case of LED groups, due to the slow reaction of the integration loop, and they generate overcurrents or undercurrents, which can lead to a flickering light, for example.

A hysteresis control, as specified above, which influences the switching behavior of the converter in order to provide an output voltage which corresponds to the changed load, and thus provide the desired current, is significantly more promising in this case. The time between two switching processes of the converter is thereby based on the output voltage and can change from cycle to cycle. Even consumers with a dynamically and very rapidly changing load can thus be supplied with a reasonably constant current.

It is a disadvantage of such a control that the changeover time is not only based on the current, but also on the output voltage and on other parameters, such as on delays of comparators, the gate voltage of the FET switch of the converter, the intensity of the gate driver, etc. This is why the current is almost always overshot or undershot, wherein the amplitude of the overshoots and undershoots are a function of the switching time and of the rise or fall, respectively, of the current. Both rise and fall of the current, in turn, are a function of the difference between input and output voltage, both of which fluctuate. A deviation of the average current from the default value is thus virtually unavoidable.

DE 10 2012 223 452 A1 shows an analog circuit, which compensates for a deviation very quickly, namely from cycle to cycle, by shifting the limit values and thus attains a correction of the average current. It is a disadvantage here that only overshoots and undershoots, respectively, which, when amplified, are greater than a diode voltage, are compensated for. In addition, a total of four amplifier circuits are used, which increases the production costs as compared with an uncompensated circuit (comprising two amplifiers/comparators).

EP 2 741 578 A1 shows a digital compensation of the overshoots and undershoots, respectively, by means of a registration of the passage of the current through a prescribed average value and compensation of the upper and lower switching thresholds. The circuit can thereby make do with only one additional comparator as compared with the uncompensated circuit.

In contrast, it is the object of the invention to propose an option for correcting deviations of the average current (i.e. of the average value of the current over one or a plurality of cycles of the DC-DC converter) from a default value and to thereby provide an even more cost-efficient production as compared with the known methods and circuits.

One aspect of the invention relates to a method for controlling the hysteresis of an output current of a DC-DC converter to a default value for an average output current and within a hysteresis range, wherein the output current is measured and is compared with a first and a second reference value, wherein a switch of the DC-DC converter is changed over at the limits of the hysteresis range on the basis of a first reference time, at which the output current reaches the first reference value, and a second reference time, at which the output current reaches the second reference value. The switch is changed over with a time delay after the second reference time, wherein the time delay is selected on the basis of a time difference between the first reference time and the second reference time in such a manner that a period of time during which the output current is higher than the default value and a period of time during which the output current is lower than the default value are compensated for.

The duration of the time delay is determined according to the method, i.e. it can be selected freely in principle. The time delay thereby denotes the time interval between the second reference time and the second changeover time assigned thereto, i.e. as a rule the changeover point which chronologically follows the second reference time before a first reference time is reached again. That time at which the output current reaches or overshoots, respectively, the respective reference value (from above or the below), is in each case identified as first or second reference time, respectively, wherein, by definition, each cycle has at least a first and a second reference time. For the determination according to the invention of the time delay, what is referred to in each case is the last (most recent) first or second reference time, respectively, prior to the changeover time determined by the time delay, out of this—theoretically infinite—number of first and second reference points. For the changeover of the switch, the difference from the preceding first reference time and, on the basis of this, the required time delay is thus determined at the second reference time; starting at the second reference time, the determined time delay is then waited out and the switch is changed over immediately after the end of the time delay, so that the sign of the change of the output current is reversed. All of the periods of time during which the output current is higher or lower, respectively, than the default value thus approach one another averaged over time. They are compensated for over one or a plurality of cycles of the DC-DC converter, preferably over each cycle, i.e. from cycle to cycle.

A further aspect of the invention relates to an apparatus for carrying out a method according to one of the embodiments which are mentioned above and which will be mentioned below, comprising measuring means for monitoring the output current of the DC-DC converter and comprising switching means for changing over a switch of the DC-DC converter, wherein the measuring means are connected to comparing means for comparing the measured output current with a first and a second reference value, wherein the comparing means are equipped to signal a reaching of the first or second reference value. The comparing means are connected to a timer, which is equipped to determine a time difference between the signals of the comparing means, wherein the timer is connected to calculating means, which are equipped to calculate a time delay on the basis of the determined time difference, after the end of which time delay the switch is to be changed over, so that a period of time during which the output current is higher than the default value and a period of time during which the output current is lower than the default value are compensated for, and wherein the calculating means are connected to the switching means, so that the switch of the DC-DC converter can be changed over after the end of the calculated time delay.

In the case of the apparatus at hand, only two reference values are compared with the output current; accordingly, only two comparators are required, i.e. no further comparator or no additional power component, respectively, is required as compared with an uncompensated control. The additional functionality for carrying out the method can be realized by means of exclusively digital components, which can be accommodated in the smallest of spaces (at least a smaller space than additional power components) even for complex tasks and which can be obtained or produced significantly more cost-efficiently.

According to a preferred simple alternative of the method, the time delay is determined as being substantially identical to the measured time difference and is changed in order to compensate for a period of time during which the output current is higher than the default value and a period of time during which the output current is lower than the default value. An explicit consideration of the reference values or of the current change rate is not required in this case in the calculation of the time delay, which simplifies the calculation.

The time delay is preferably determined by means of linear extrapolation of the current change of the output current, based on the second reference time and on the basis of the measured time difference, the two reference values of the output current, and a predetermined limit value of the hysteresis range, and is changed in order to compensate for a period of time during which the output current is higher than the default value and a period of time during which the output current is lower than the default value. Accordingly, the calculating means of the apparatus are preferably equipped for the linear extrapolation of the current change of the output current. A linear extrapolation can be realized particularly easily. It is based on the fact that the current change between the changeover points of the hysteresis control runs substantially linearly and is thus a robust approximation, which is correct at least on average. That is, the rate of change (mathematically: the time derivative) of the output current between the changeover times at the limits of the hysteresis range is considered to be substantially constant and is estimated with the ratio of the difference between the second and the first reference value to the time difference between the second and the first reference time. The time delay is determined from the difference between the default limit value of the hysteresis range and the second reference value, after which time delay the output current is expected to reach the limit value, based on the second reference time. Depending on the selection of the reference values, the mentioned difference can be divided by the determined rate of change in order to determine the time delay. The uncorrected time delay determined in this manner is subsequently also changed, i.e. extended or shortened, if applicable, in order to compensate for the periods of time during which the output current is above or below the default value, respectively.

It is furthermore advantageous when the time differences between all of the reference times which are reached during a complete cycle of the DC-DC converter, at which reference times the output current reaches the respective reference value, are measured, and a first period of time during which the output current was higher than the default value and a second period of time during which the output current was lower than the default value are determined from the measured time differences, the two reference values, and the default value for the average output current, wherein the time delay is changed in such a manner in the following cycle that a difference between the first and the second period of time is compensated for.

It is advantageous analogously when the calculating means are equipped to store all of the time differences between the signals of the comparing means, which time differences are determined during a complete cycle of the DC-DC converter, and the calculating means are suitable for determining a first period of time during which the output current was higher than the default value and a second period of time during which the output current was lower than the default value from the determined time differences, the two reference values, and the default value for the average output current, and for changing the time delay in the following cycle in such a manner that a difference between the first and the second period of time is compensated for. The times at which the output current reaches the default value—as well as at least one of the changeover times—can here be determined by means of interpolation or extrapolation between the two reference values and reference times. Based on the knowledge of the changeover times between the passages, determined in this manner, of the output current through the default value, an allocation of the periods of time between these passages as "above" or "below", respectively, the default value can be made, so that it can be deduced from the difference between the periods of time whether the output current on average was higher than the default value or lower than the default value for a longer time period. Based on the linear current changes, such chronological asymmetries lead to a corresponding deviation, i.e. upward or downward, of the average current from the default value. In that a compensation of these asymmetries is effected by means of a corresponding correction of the time delay and thus of at least one changeover time with the goal of a chronologically compensated distribution of the output current above and below the default value, the average output current can also be corrected, and it then corresponds to the default value.

It has proven to be favorable when the second reference value corresponds to the default value of the output current. In this case, the times of the passage through the default value can be measured directly, and they do not need to be determined by estimation on the basis of the first and the second reference time. The periods of time during which the output current is above or below the default value, respectively, are thus exactly known from the measurement, so that the correction of the time delay, which is based thereon, can likewise be carried out exactly. The output current on average can thus be approximated to the default value in a particularly accurate manner.

It is furthermore advantageous when the first reference value either corresponds to a lower limit value of the hysteresis range, wherein a crossing of a lower limit of the hysteresis range corresponds to the first reference time, and the changeover time at an upper limit of the hysteresis range is determined from the time difference between the second reference time and the first reference time as well as the current difference between the second reference value and the lower limit value of the hysteresis range, or—in the alternative—corresponds to an upper limit value of the hysteresis range, wherein a crossing of an upper limit of the hysteresis range corresponds to the first reference time, and the changeover time at a lower limit of the hysteresis range is determined from the time difference between the second reference time and the first reference time as well as the current difference between the upper limit value of the hysteresis range and the second reference value. In the case of each of these two alternatives, a time delay is only used in the case of one of the two limits of the hysteresis range, i.e. a correction of the periods of time is only possible on one side of the default value. So that a compensation is nonetheless made possible in both directions, i.e. prior to as well as after the reaching of an adjacent limit value, the second reference value in this case should be slightly within the hysteresis range, i.e. should not correspond to one of the limit values, e.g. within the central 95% relative to the span of the hysteresis range. Ideally, the second reference value or default value, respectively, is exactly in the middle of the hysteresis range, in order to depict the average value. An advantage of these two alternatives lies in the simpler implementation since, starting from the first reference time, no time delay must be waited out, but rather the switch is changed over immediately at this point.

The invention will be discussed in more detail below on the basis of a particularly preferred exemplary embodiment, to which the invention is not intended to be limited, however, and with reference to the drawings. In detail, in the drawings.

Figure 1:
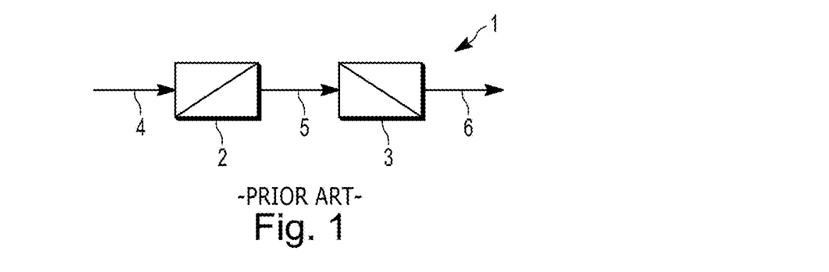
FIG. 1 shows a schematic block diagram of a DC-DC converter chain, which is conventional per se, for supplying an LED group.

FIG. 1 shows the basic design of a typical application scenario of the method at hand or of the apparatus at hand. It is a chain 1 of DC-DC converters 2, 3, comprising a boost converter 2 and a buck converter 3. The boost converter 2 is connected to a (supply) mains voltage 4, which it converts into a higher intermediate circuit voltage 5. The buck converter 3 or in general a plurality of buck converters are connected to the provided intermediate circuit voltage 5 and, based thereon, create a predetermined output current 6. The output voltage of the buck converter 3 is thus controlled in such a manner that, depending on the connected load (not illustrated), it brings about a predefined output current 6.

Figure 2:
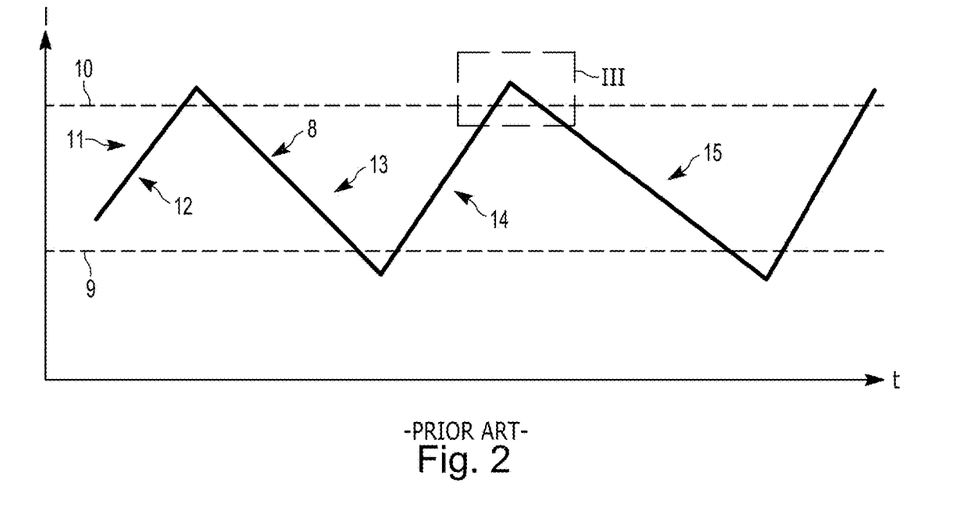
FIG. 2 shows a diagram of the current profile in the case of a hysteresis controller according to the prior art.

The DC-DC converters 2, 3 have—in a manner which is known per se and which is thus not shown or described in any more detail—a switch, which substantially operates periodically (cf. switch 7 in FIG. 5) and one or a plurality of energy stores. The desired output voltage or the desired output current 6 of the buck converter 3 is attained by means of corresponding adjustment or control of the charge and discharge cycles of the energy store. A profile 8 of the output current 6 of a corresponding hysteresis controller, which is known in the prior art, is illustrated in FIG. 2. The abscissa t is a time axis, wherein the scaling is chosen in such a manner that approximately two full charge/discharge cycles of the energy store can be seen. The output current 6 of the controlled converter 3 is plotted on the ordinate I, wherein the two horizontal dashed lines 9, 10 mark a lower limit value 9 and an upper limit value 10 of the output current 6. The range between the two limit values 9, 10 is the hysteresis range 11. The predetermined value of the output current 6 lies in the middle of the hysteresis range 11 between the two limit values 9, 10.

The illustrated current profile 8 starts with a charge section 12. As soon as the output current 6 overshoots the upper limit value 10, this is recognized by a current measurement and the charge section 12 is then ended and a discharge section 13 begins. Due to a switching delay $\Delta t$ (cf. FIG. 3) during the measuring, the upper limit value 10 is overshot. The same applies analogously for the undershooting of the lower limit value 9. As soon as the output current 6 reaches the lower limit value 9, the discharge section 13 is ended here, and a new charge section 14 is started. The average value of the output current 6 over one or a plurality of cycles is intended to correspond to the predetermined value. This goal can only be attained here, if the overshoots and undershoots of the two limit values 10, 9 in a cycle are identical by chance. In practice, however, this is not the case, because fluctuations of the supply voltage 5 and of the load, for example, contribute to constantly and rapidly changing conditions.

Figure 3:
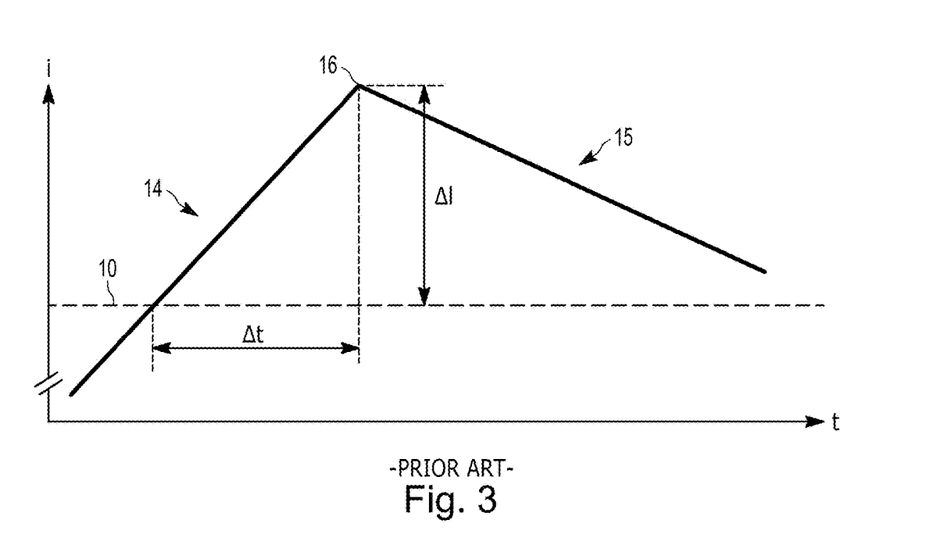
FIG. 3 shows a section from FIG. 2, according to the area III in FIG. 2.

The transition from the second charge section 14 to the second discharge section 15 is marked in FIG. 2 by the rectangular area III and is illustrated in detail in FIG. 3. The diagram axes t, I in FIG. 3 are accordingly identical with FIG. 2. The horizontal dashed line marks the upper limit value 10 of the output current 6. It can be clearly seen here that the changeover from the charge section 14 into the discharge section 15 does not occur immediately upon the reaching of the limit value 10, but only after a switching delay $\Delta t$. Due to the fact that the energy store of the buck converter 3 is still charged during the time $\Delta t$, the output current 6 also continues to rise. At the reversal point 16 between the charge section 14 and the discharge section 15, the output current 6 reaches a value which is above the upper limit value 10 by a difference $\Delta I$. After the reversal point 16, the extent $\Delta I$ of the overshoot must first be discharged during the discharge section 15, before the output current 6 is within, i.e. in this case below, the upper limit value 10 again.

As can be seen in FIGS. 2 and 3, the gradients of the charge section 14 and of the discharge section 15 are generally different. A constant switching delay $\Delta t$ thus leads to different current differences $\Delta I$, wherein the difference $\Delta I$ is greater the greater the gradient of the delayed section 14, 15 (wherein it goes without saying that this also applies with negative sign, i.e. in the range of the lower limit value 9). In addition to the changing supply voltage 5 and the changing load, this effect also contributes to the fluctuations of the difference $\Delta I$. In addition, slower changes, for example due to temperature influences or signs of aging, must be considered as well. Without an additional control or compensation, the average value of the current 6, which is generated by the buck converter 3, under the listed influences often deviates greatly from the predetermined value.

Figure 4:
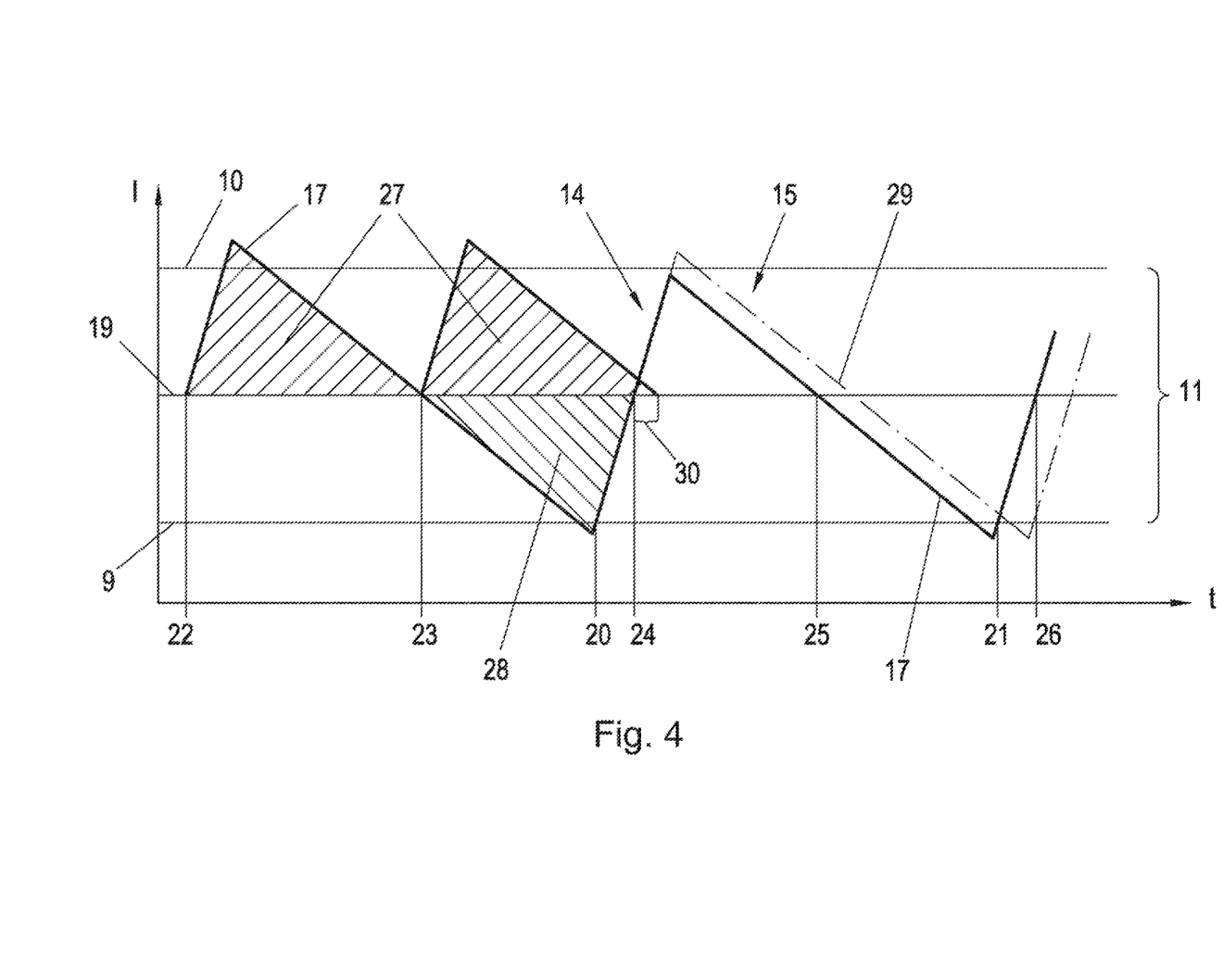
FIG. 4 shows a diagram of the current profile in the case of a hysteresis controller according to the method at hand.

A current profile 17 or a voltage profile at a shunt resistor 18 (cf. FIG. 5) in the case of a current control according to the method at hand is illustrated in FIG. 4. The abscissa t is a time axis, wherein the scaling is chosen in such a manner that approximately two full charge/discharge cycles of an energy store can be seen. The output current 6 of the controlled converter 3 is plotted on the ordinate I, wherein the two horizontal lines 9 and 10, respectively, mark a lower limit 9 and an upper limit 10, respectively, of the output current 6. The range between the two limit values 9, 10 is the hysteresis range 11. The default value 19 of the average output current 6 lies in the middle of the hysteresis range 11 between the two limit values 9, 10.

In this exemplary embodiment, the lower limit 9 is used as first reference value and the default value 19 as second reference value. The first reference times 20, 21, at which the output current reaches the lower limit value 9, and the second reference times 22 to 26, at which the output current 6 reaches the default value 19, are illustrated accordingly in FIG. 4. So that the time delay of the switching process does not distort the estimation of the current change rate, only the passage at the rising edge of the output current can be considered for the first reference times 20, 21. This is advantageous, but not mandatory. For the second reference times 22 to 26, the passages both at the falling edge and at the rising edge of the output current are considered. Due to the fact that a switching does not take place here, there are also no voltage-dependent delaying components. The residual error (comparator delay) is identical for all positive (22, 24, 26) and negative (23, 25) transitions and thus becomes zero on average.

For ease of reference in the following discussion and without limiting the generality, the cycle between the reference times 22 and 24 is identified as first cycle and the cycle between the reference times 24 and 26 as the second cycle.

The changeover time at the lower limit 9 of the hysteresis range 11 is determined in a manner which is known per se, i.e. the switch 7 is changed over when the lower limit value 9 is reached, so that the output current rises again after the inevitable time delay (cf. FIG. 2 and corresponding description).

The changeover time at the upper limit 10 of the hysteresis range 11, however, is not determined in this manner. Instead, a changeover counter is already reset and started at the beginning of the charge section 14 when the first reference value is reached, i.e. at the reference time 20. The changeover counter is then incremented with a prescribed frequency while the output current rises. As soon as the second reference value is reached, i.e. at the reference time 24 in FIG. 4, the counting direction of the changeover counter is reversed, i.e. the changeover counter is decremented from that time. As soon as the changeover counter reaches a correction value, which is initialized with zero—which correction value can thus initially be taken to be zero—the switch 7 is changed over and the charge section 14 is ended, and the discharge section 15 begins. The changeover time at the upper limit 10 of the hysteresis range 11 is thus determined from the measurement of a time delay and the rise of the output current 6 in the charge section 14, which rise was implicitly determined immediately beforehand. The measured time delay begins with the second reference time 24 and the reversal of the counting direction. The end of the time delay triggers the changeover of the switch 7. In the particularly simple case at hand, the time delay from the second reference time 24 up to the subsequent changeover time can be assumed to be equal to the period of time between the first reference time 20 and the second reference time 24, due to the selection of the first and second reference values. A calculation of the time delay based on the current differences and a determined current change rate is not required in this case. In general, i.e. in the case of reference values which are selected differently, the current rise per time unit in the charge section 14 can be calculated from the known reference values and the measured period of time between the first reference time and the second reference time. By division by the determined current rise, the time delay to be waited out can be determined from the difference between the upper limit value 10 and the second reference value, so that the switch 7 is changed over when the upper limit value 10 is reached.

The described estimation of the changeover time at one of the limits of the hysteresis range 11 alone would not yet lead to a compensation of fluctuations of the output current. However, it provides the already suggested option of introducing a correction value for changing the time delay, i.e. the changeover time can be shifted forward in time or backward in time with the help of this correction value. As a result, this corresponds to a temporary shift of the assigned limit value, i.e. the upper limit value in the example at hand, but without necessitating the manipulation of a load component. The time delay can be calculated and measured purely digitally, if the switch 7 is controlled digitally.

In the example at hand, the correction value is determined by a comparison of the periods of time during which the output current 6 is above or below the default value 19, respectively. In order to illustrate these periods of time, the corresponding areas 27, 28 in FIG. 4 are shaded differently. The areas 27, 28 between the current profile 17 and the default value 19 form triangles with generally different edge lengths. In order to visually illustrate the comparison, the area 27 above the area 28 is reproduced once again in FIG. 4, which allows a direct comparison of the lengths of the horizontal edges (sides), which correspond to the periods of time above and below the default value 19, respectively. In the illustrated example, the period of time of the upper area 27 is longer than that of the lower area 28, which means that the output current 6 in the first cycle was higher than the default value 19 for a comparatively long period of time. The reason for this deviation was a delayed changeover in the first cycle at the upper limit 10 of the hysteresis range 11, which may be attributable for example to a load change (a suddenly smaller load). The average output current in the first cycle was thus raised as compared with the default value 19. Without a correction—assuming no further load changes—the output current 6 would follow the uncorrected current profile 29 in FIG. 4. Even though the average output current would correspond to the default value 19 in the second cycle, on average over both cycles it would still be greater than the default value 19. An effective correction value should thus ensure a compensation, so that the average output current over both cycles after the second cycle corresponds to the default value 19 again.

The correction value can be determined from a measurement of the difference between the periods of time. A compensation counter is here reset and started, as soon as a first reference time is reached in a charge section, i.e. at the reference time 22 in the first cycle. As of this reference point 22, the compensation counter is incremented with a predetermined frequency. As soon as a first reference time is reached in a discharge section, i.e. at the reference time 23, the counting direction of the compensating counter is reversed, i.e. the compensating counter is decremented as of this point in time. When the first reference point is then reached in the following charge section 14, the value of the compensating counter is proportional to the difference 30 between the periods of time above and below the default value 19, respectively. This difference 30, however, should not be used directly as correction value, but should be multiplied by a proportionality factor. This proportionality factor corresponds to the ratio of the time passed in the charge section 14 or discharge section 15: due to the higher current change rate, the charge section 14 is shortened less than the discharge section 15 with a comparatively small current change rate. The correction value of the delay, which is determined in this manner, is thus proportional to the time spent in excess in the charge section 14. It can be seen immediately from FIG. 4 that the difference between the changeover times of the corrected current profile 17 and of the uncorrected current profile 29 at the upper limit of the hysteresis range is smaller than the difference between the periods of time of the areas 27 and 28.

Figure 5:
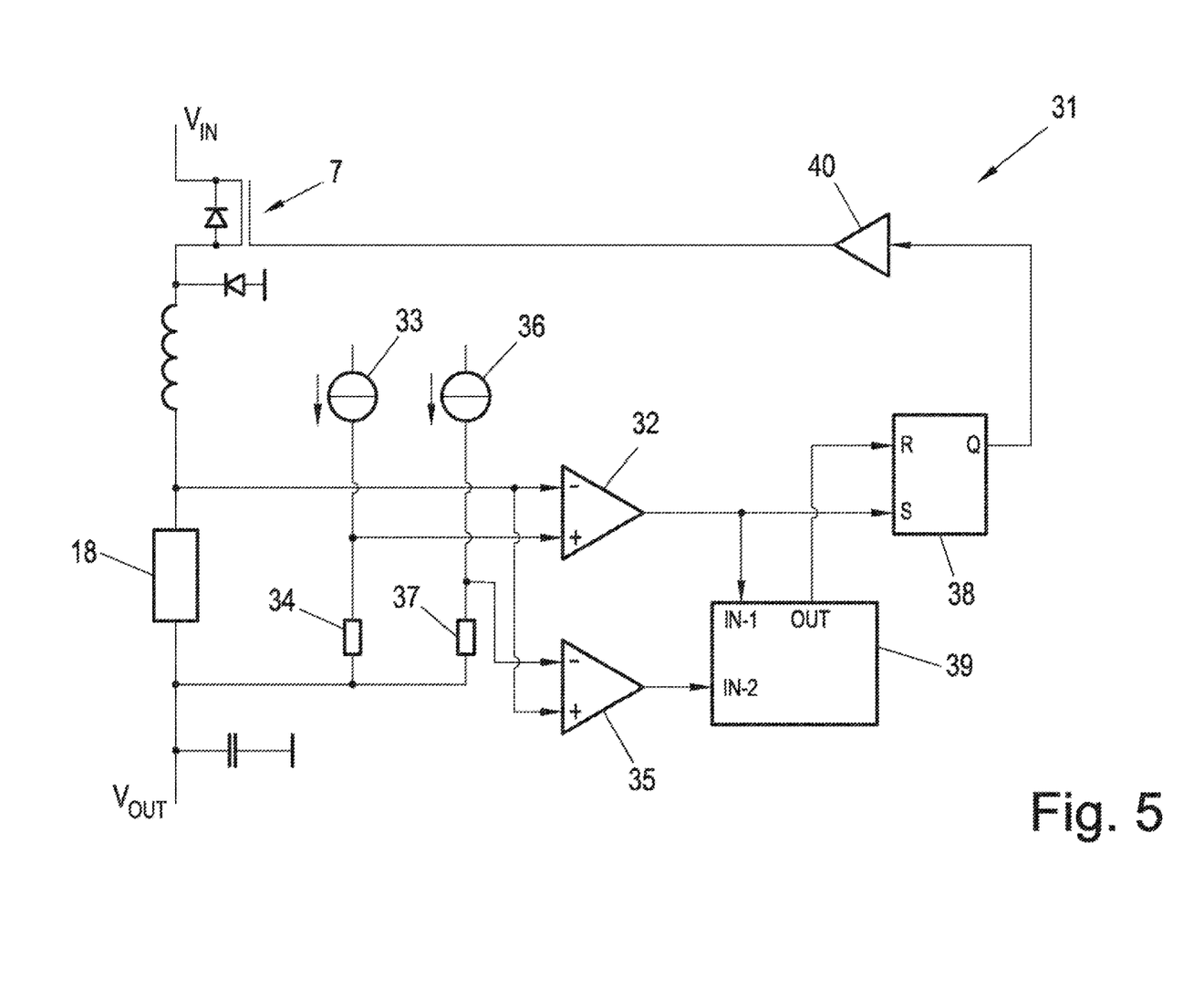
FIG. 5 shows a schematic block diagram of a preferred apparatus for carrying out the method illustrated in FIG. 4.

An apparatus 31, which is equipped according to the discussed method to carry out such a hysteresis control, is illustrated in FIG. 5 by means of a schematic block diagram. A switch 7 of a buck converter 3 (cf. FIG. 1) as well as a shunt resistor 18, which is connected to the buck converter 3 on the output side ($V_{OUT}$), are here indicated schematically. The switch 7 is preferably a semiconductor switch, in particular an FET (FET, field effect transistor). A "+" input of a first comparator 32 is connected to the shunt resistor 18, which belongs to a load circuit (not shown). This comparator 32 compares the voltage drop at the shunt resistor 18 with a first reference voltage according to a first reference value. It activates a voltage at the output when the first reference value (at the "−" input of the comparator 32) is reached or undershot. The first reference voltage is applied to a first reference resistor 34 with respect to the output voltage $V_{OUT}$ of the buck converter 3 by means of a first reference current source 33. In addition, a second comparator 35 is connected to the shunt resistor 18 (to the "−" input). The second comparator 35 compares the voltage drop at the shunt resistor 18 with a second reference voltage (applied at its "+" input) according to a second reference value. It activates a voltage at the output when the second reference value is reached or overshot. The second reference voltage is applied to a second reference resistor 37 with respect to the output voltage $V_{OUT}$ of the buck converter 3 by means of a second reference current source 36. To avoid high power losses, the current of the two reference current sources 33, 36 should be in the μA range. Based on this, the dimensioning of the reference resistors 34, 37 can be in the 100 kΩ range, for example.

The output of the first comparator 32 is connected to the set input of a flipflop 38 and to a first input IN-1 of a digital controller 39. The output of the second comparator 35 is connected to a second input IN-2 of the digital controller 39. An output OUT of the digital controller 39 is connected to the reset input of the flipflop 38. The digital controller 39 comprises calculating means and a timer in the form of a high-frequency clock. The frequency of the clock must be high as compared with the maximum switching frequency of the buck converter 3. If the converter 3 can switch with a frequency of up to 2 MHz, for example, the frequency of the clock should be 200 MHz or higher, so as not to introduce any significant errors during the time measurement. The calculating means of the digital controller 39 comprise the above-discussed counters, i.e. a changeover counter and a compensation counter, and are equipped to carry out the described method. Based on the signals received by the comparators 32, 35 at the inputs of the digital controller, they can increment the counters, reset, decrement and change over the counting direction, and apply a signal at the output for the flipflop 38 based on the counter reading. The output Q of the flipflop 38 is connected via a gate driver 40 to the switch 7, e.g. to the gate thereof in the case of an FET, so that the switch 7 is switched on or switched off, depending on the signal at the output Q of the flipflop 38.

Figure 6:
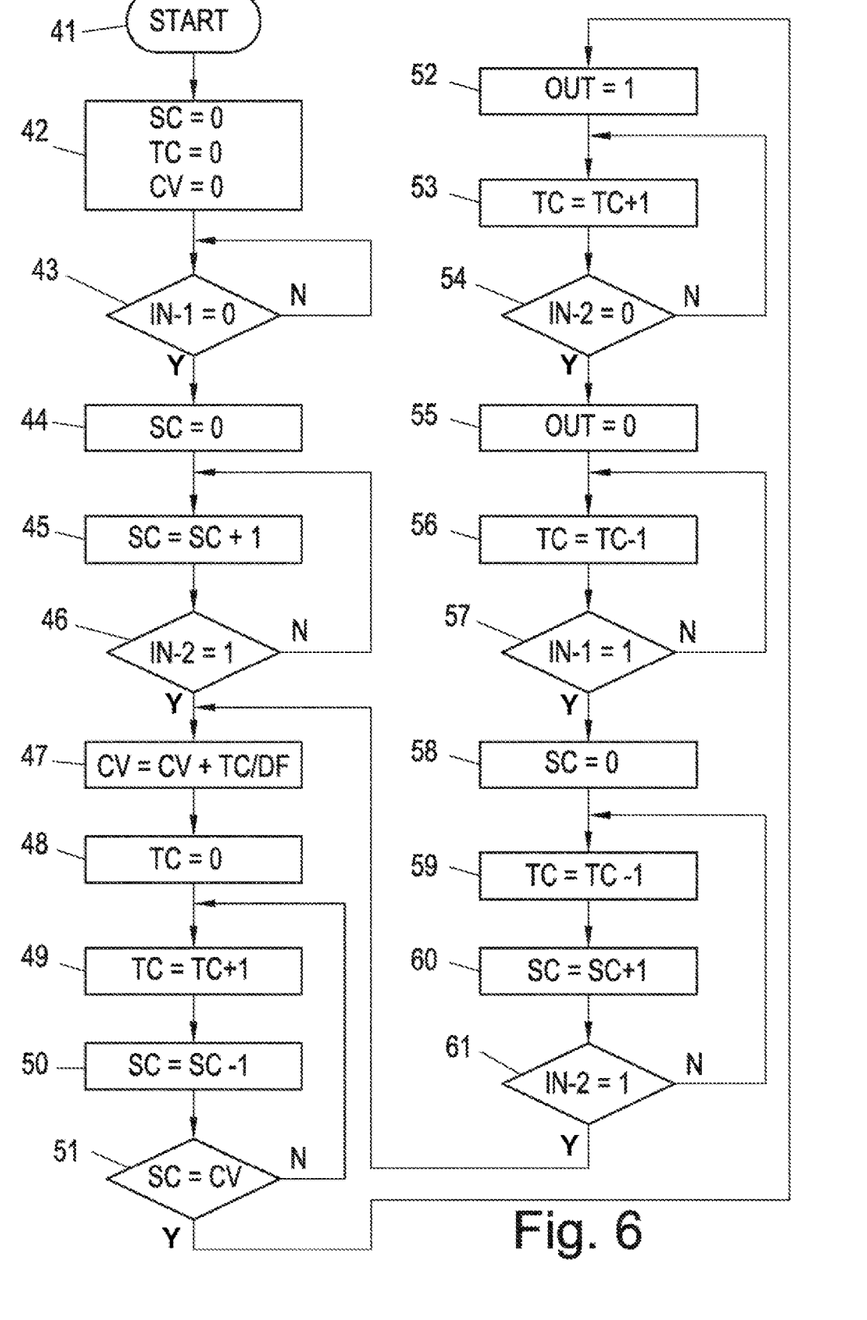
FIG. 6 shows the sequence of the method at hand in a flowchart.

A method sequence, which is possible with the circuit according to FIG. 5, which method sequence will now be discussed in detail, is illustrated in FIG. 6 in a flowchart. After a start field 41, a resetting of a switch counter SC, which is realized in the digital controller 39 according to FIG. 5, as well as of a triangle counter TC and also of a correction value CV occurs in the flowchart according to FIG. 6. After this reset block 42, a query is made according to a query field 43, as to whether the current is already identical to or above, respectively, the first threshold value or reference value, respectively ((IN-1)=0?); should this not be the case, the input of the query field 43 is reverted back to, and this query is repeated, until the query result is positive. When a determination has thus been made that the current is above the first threshold value, the flipflop 38 according to FIG. 5 is then switched to "on" according to block 44 and SC is set to 0. In the next block 45, the value SC is increased by "1", and it is queried according to the query field 46, whether the current is now already above the second threshold value or reference value, respectively, i.e. (IN-2)=1?. If the answer is "no", i.e. if the current lies between the first threshold value and the second threshold value, the input of the block 45 is reverted to, in order to increment the switch counter SC by "1" again. In the other case, however, the correction value CV is increased by an amount TC/DF according to block 47, wherein DF is a fixed damping factor, which is stored in the digital controller 39. According to block 48, the triangle counter TC is then set to "0", and according to block 49, this counter TC is then incremented by "1", whereupon the switch counter SC is decremented by "1" according to block 50. A query is then made according to the query field 51, as to whether the values SC and CV are equal, i.e. as to whether the switch-off time is already reached; if the answer is "no", block 49 is reverted to; in the other case, however, the output "Out" of the digital controller 39 according to FIG. 5 is set to "1" according to a block 52, which means that the switch-off time is reached, and that delays according to the switching technique are created as of this point in time. A signal is thereby applied to the reset input R of the flipflop 38, which is connected to the output "Out", and the output Q of the flipflop 38 is thus set to "0" (i.e. "OFF"), and the switch 7 is opened or switched off, via the gate driver 40, which is connected to the output Q of the flipflop 38.

In connection therewith, the counter value TC is incremented by "1" according to block 53, and a query is made in the query field 54, as to whether the value (IN-2) at the input of the digital controller 39 equals "0", which means that a query is made, as to whether the current is already below the second threshold value. If the answer is "no", the block 53 is reverted to; otherwise, the output "Out" of the digital controller 39 is now set to "0" according to block 55, which means that the reset input R of the flipflop 38 is set to "0" (i.e. "OFF") or remains at "0" ("OFF"). According to block 56 in the flowchart according to FIG. 6, the value TC is then decremented by "1", and a query is now made according to the query field 57, as to whether the value at the input is (IN-1)=1, i.e. whether the current is already below the first threshold value. If the answer is "no", the block 56 is reverted to, otherwise the value SC for the switch counter is set to "0" according to block 58, whereby what applies here is that the current is below the first threshold value and the flipflop 38 is switched to "on". According to block 59, the value TC is then decremented by "1", and according to block 60, the value SC is incremented by "1". A query is then made according to the query field 61, as to whether the input is (IN-2)=1, i.e. whether the current is already above the second threshold value. If the answer is "no", a transition is made to the input of block 59; otherwise, (output "yes") it is established that that the current is above the second threshold value, and in the present case, the input of block 47 is reverted to in order to pass through a next loop.

Based on the above example, it goes without saying that the person of skill in the art can provide an equivalent circuit, in the case of which the first reference value corresponds to the upper limit value 10 of the hysteresis range 11 (see FIG. 4), wherein only the first reference current source 33 and/or the first reference resistor 34 must be adapted in FIG. 5. In addition, in the case of an equivalent solution of this kind, the overshooting (condition IN-1'=0) of the upper limit valve 10 would preferably always (starting at the first cycle) be awaited and the undershooting of the upper limit value 10 would never be awaited, while in the case of the above-described process, in the first cycle, the overshooting (condition IN-1=0) of the lower limit valve 9 and as of that point preferably always only the undershooting (condition IN-1=1) of the lower limit value 9 are awaited. With regard to the second reference value, the overshooting (condition IN-2=1) as well as the undershooting (condition IN-2=0) are monitored in both situations. Without taking an inventive step, the person of skill in the art can additionally adapt the digital controller 39 in such a manner that any reference values can be used, without departing from the scope of the invention. Both of the above are in particular advantageous when the buck converter 3 is to be operated in the DCM (discontinuous conduction mode), while the detailed statement made previously describes a buck converter 3 which implicitly prevents precisely this.

Without having to take an inventive step, the person of skill in the art can also adapt the sequence of the digital controller 39, in order to attain a different control behavior for the average value correction, that is to say for the changing of the time delay after the second reference time.

LIST OF REFERENCE SIGNS

1 DC-DC converter chain
2 boost converter
3 buck converter
4 mains voltage
5 supply voltage
6 output current
7 switch of the buck converter
8 chronological profile of the output current
9 lower limit value (constant)
10 upper limit value (constant)
11 hysteresis range (constant)
12 charge section
13 discharge section
14 second charge section
15 second discharge section
16 reversal point
17 current profile
18 shunt resistor
19 default value
20, 21 first reference times
22-26 second reference times
27 area of the current profile above the default value
28 area of the current profile below the default value
29 uncorrected current profile
30 difference between the periods of time above and below the default value, respectively
31 apparatus
32 first comparator
33 first reference current source
34 first reference resistor
35 second comparator
36 second reference current source
37 second reference resistor
38 flipflop
39 digital controller
40 gate driver
41-61 instructions and branching in the flowchart

The invention claimed is:

1. A method for controlling hysteresis of an output current from a DC-DC converter to a default value for an average output current and within a hysteresis range comprising:
measuring the output current and comparing the output current to a first and a second reference value, changing over a switch of the DC-DC converter at limits of the hysteresis range based on a first reference time, wherein at the first reference time the output current reaches the first reference value, and a second reference time, wherein at the second reference time the output current reaches the second reference value,
changing over the switch following a time delay after the second reference time, wherein the time delay is selected on the basis of a time difference between the first reference time and the second reference time and compensates for a period of time during which the output current is higher than the default value and a period of time during which the output current is lower than the default value.

2. The method as claimed in claim 1, wherein the time delay is determined as being substantially identical to the time difference and is changed, the time delay change compensating for a period of time during which the output current is higher than the default value and a period of time during which the output current is lower than the default value.

3. The method as claimed in claim 1, wherein the time delay is determined using linear extrapolation of the current change of the output current, based on the second reference time and on the basis of the measured time difference, the two reference values of the output current, and a predetermined limit value of the hysteresis range, and is changed, the time delay change compensating for a period of time during which the output current is higher than the default value and a period of time during which the output current is lower than the default value.

4. The method as claimed in claim 1, wherein the time differences between all of the reference times reached during a complete cycle of the DC-DC converter, wherein the output current reaches the respective reference value, are measured, and a first period of time during which the output current was higher than the default value and a second period of time during which the output current was lower than the default value are determined from the time differences, the two reference values, and the default value for the average output current, wherein the time delay is changed in the following cycle, the time delay change compensating for a difference between the first and the second period of time.

5. The method as claimed claim 1, wherein the second reference value corresponds to the default value of the output current.

6. The method as claimed in claim 1, wherein the first reference value corresponds to a lower limit value of the hysteresis range, wherein a crossing of a lower limit of the hysteresis range corresponds to the first reference time, and the changeover time at an upper limit of the hysteresis range is determined from the time difference between the second reference time and the first reference time as well as the current difference between the second reference value and the lower limit value of the hysteresis range.

7. The method as claimed in claim 1, wherein the first reference value corresponds to an upper limit value of the hysteresis range, wherein a crossing of an upper limit of the hysteresis range corresponds to the first reference time, and the changeover time at a lower limit of the hysteresis range is determined from the time difference between the second reference time and the first reference time as well as the current difference between the upper limit value of the hysteresis range and the second reference value.

8. An apparatus for controlling the hysteresis of an output current from a DC-DC converter to a default value for an average output current and within a hysteresis range comprising:
   a measuring element configured to monitor the output current of the DC-DC converter and
   a switching element configured to change over a switch of the DC-DC converter, wherein the measuring element is connected to a comparing element configured to compare the measured output current with a first and a second reference value, wherein the comparing element is configured to signal a reaching of the first or second reference value, wherein the comparing element is coupled to a timer, the timer configured to determine a time difference between the signals of the comparing element, wherein the timer is coupled to a calculating element, the calculating element configured to calculate a time delay on the basis of the determined time difference, wherein after the end of the time delay the switch is to be changed over, and compensating for a period of time during which the output current is higher than the default value and a period of time during which the output current is lower than the default value, and wherein the calculating is coupled to the switching element, the DC-DC converter being changed over after the end of the calculated time delay.

9. The apparatus as claimed in claim 8, wherein the calculating element is configured to linearly extrapolate the current change of the output current.

10. The apparatus as claimed in claim 8, wherein the calculating element is configured to store all of the time differences between the signals of the comparing element, which time differences are determined during a complete cycle of the DC-DC converter, and the calculating element is configured to determine a first period of time during which the output current was higher than the default value and a second period of time during which the output current was lower than the default value from the determined time differences, the two reference values, and the default value for the average output current, and to change the time delay in the following cycle, the time delay change compensating for a difference between the first and the second period of time.

11. The apparatus as claimed in claim 8, wherein the second reference value corresponds to the default value of the output current.

12. The apparatus as claimed in claim 8, wherein the first reference value corresponds to a lower limit value of the hysteresis range.

13. The apparatus as claimed in claim 8, wherein the first reference value corresponds to an upper limit value of the hysteresis range.

* * * * *